United States Patent
Jessberger et al.

(12) 
(10) Patent No.: US 6,341,598 B1
(45) Date of Patent: Jan. 29, 2002

(54) DEVICE FOR REGULATING THE TEMPERATURE OF THE INTAKE AIR OF MIXED COMPRESSION INTERNAL COMBUSTION ENGINES WITH A PRESSURE BOX

(75) Inventors: Thomas Jessberger, Rutesheim (DE); Jan Karlsson, Vaestra Froelunda (SE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/622,714
(22) PCT Filed: Mar. 12, 2001
(86) PCT No.: PCT/EP98/04887
  § 371 Date: Aug. 22, 2000
  § 102(e) Date: Aug. 22, 2000
(87) PCT Pub. No.: WO99/07989
  PCT Pub. Date: Feb. 18, 1999

(30) Foreign Application Priority Data

Aug. 11, 1997 (DE) .......................... 197 34 662

(51) Int. Cl.$^7$ ............................................... F02M 31/06
(52) U.S. Cl. ...................................................... 123/556
(58) Field of Search .......................................... 123/556

(56) References Cited

U.S. PATENT DOCUMENTS

| | | | | |
|---|---|---|---|---|
| 4,231,343 A | * | 11/1980 | Alf et al. ..................... | 123/556 |
| 4,249,500 A | * | 2/1981 | Behrendt et al. ............ | 123/556 |
| 4,259,936 A | * | 4/1981 | Bach et al. .................. | 123/556 |
| 4,273,564 A | * | 6/1981 | Sugie et al. ................. | 123/556 |
| 4,292,949 A | * | 10/1981 | Bendig ........................ | 123/556 |
| 5,421,307 A | * | 6/1995 | Andress et al. ............. | 123/556 |

* cited by examiner

*Primary Examiner*—Marguerite McMahon
(74) *Attorney, Agent, or Firm*—Crowell & Moring LLP

(57) ABSTRACT

A device for regulating the intake air of an internal combustion engine, including a pressure box (41), a sealing system on the pressure box, and an opening (42) in the pressure box. A movable mechanical part (43) extends into the pressure box (41) through the opening (42), and the sealing system seals the pressure box (41) in relation to the movable mechanical part. The sealing system includes a synthetic resin friction bearing (45) which contacts the movable part (43) over a predetermined length and which is firmly anchored in the opening (42) of the pressure box (41) by the sealing system. A Teflon ring is arranged in the sealing system at one end of the synthetic resin friction bearing (45) surrounding the movable part (43) in such a way that it is pressure tight.

4 Claims, 1 Drawing Sheet

Figure 1:
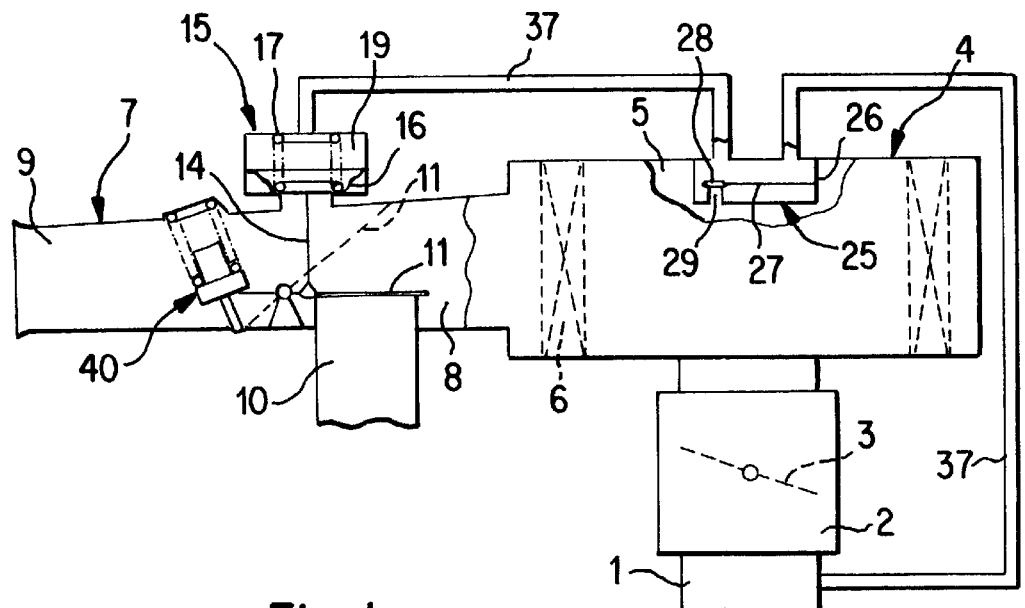

DEVICE FOR REGULATING THE TEMPERATURE OF THE INTAKE AIR OF MIXED COMPRESSION INTERNAL COMBUSTION ENGINES WITH A PRESSURE BOX

STATE OF THE ART

The invention relates to a device for regulating the temperature of the intake air of a mixture-compressing internal combustion engine with a pressure box, wherein a moving part extends into the pressure box.

Sealing systems are known in which synthetic resin or rubber rings are placed in the pressure box and surround the moving part in a pressure-tight manner. Also, it is considered to be known to guide a moving part in synthetic resin friction bearings.

In DE 26 24 210 C2 a device of this general kind is disclosed in which, in order to regulate the temperature of the intake air of mixture-compressing internal combustion engines, a control flap in the raw air connection of an intake air filter cooperates with a pneumatic adjusting motor, or pressure box. In one end position, by means of a return spring passing through a pressure control chamber, a warm air passage is closed if the pressure falls below a predetermined target vacuum and at the same time a cold air passage is opened, the pressure control chamber of the servo motor being connected through a pressure control line to the section of the air intake duct situated downstream from an arbitrarily operated main throttle valve. The pressure control line has a valve which is actuated in dependence on the temperature and which contains a valve body operated by a bimetal strip, and moves the valve body to the open position when the predetermined target temperature is reached in order to open a connection to the clean air chamber of the intake air filter.

Such a device serves to keep the temperature of the intake air of the internal combustion engine within a certain range. Only when the main throttle valve is opened, i.e., under full-load operating conditions, is the internal combustion engine to draw in colder air so as to achieve a better degree of fill and a higher power.

The guidance of the operating rod from the pressure box adjusting motor to the pivotable control flap is in this case problematical, since not only can forces arise in the direction of thrust, but also lateral deflections must be absorbed.

OBJECT OF THE INVENTION

It is the object of the invention to improve a device of the kind described above such that proper guidance and mechanical movement of the mechanical part extending into the pressure box will be assured, combined with good sealing of the part.

ADVANTAGES OF THE INVENTION

The device of the general kind according to the invention advantageously permits, by a combination of the features as described and claimed herein, after a simple construction of the control of a pivoting flap valve by a pressure box in the intake duct, wherein, in the opening in the pressure box through which a moving mechanical part can be extended into the interior of the pressure box, a good seal is achieved and at the same time the movement and guidance of the mechanical part is assured.

In accordance with the invention, an operating rod is formed as a mechanical part from elements which can turn about an additional axis. The entire sealing and guiding system is advantageously formed from a synthetic resin friction bearing in contact over a given length with the moving element of the mechanical part which bearing is firmly anchored over the entire sealing system, including in the opening in the pressure box, and at one end of the synthetic resin friction bearing a Teflon ring is arranged in the sealing system which surrounds the moving part in a pressure-tight manner.

In one advantageous embodiment, a ring of elastomer is disposed externally around the Teflon ring in the sealing system, and tightly grips the Teflon ring. Such combinations of a sealing ring and an element encompassing the sealing ring are themselves known in normal piston guiding means, for example from U.S. Pat. No. 4,878,766. According to the invention, however, the peculiarities in the case of pressure boxes, with regard to the specific combination of the action of the seal and the unavoidable lateral deflection of the operating rod and the specific guidance problems which thus arise, play an important role. Simple installation of the device in an air induction system for an internal combustion engine is achievable if the vacuum box can be integrated by a bayonet lock into the raw air intake nipple.

In the previously described embodiment, the vacuum box advantageously performs guiding functions for the linkage, as mentioned, so that here a separate bearing in the air intake housing is unnecessary. Due to the sealed linkage, sealed especially against the intake duct vacuum, it is possible to mount the vacuum box simply and directly into an intake duct housing.

These and additional features of preferred embodiments of the invention will be found not only in the claims but also in the description and the drawings, the individual features being applicable individually or jointly in the form of subcombinations in embodiments of the invention and in other fields and may represent advantageous as well as independently patentable embodiments, for which protection is hereby claimed.

DRAWING

Figure 2:
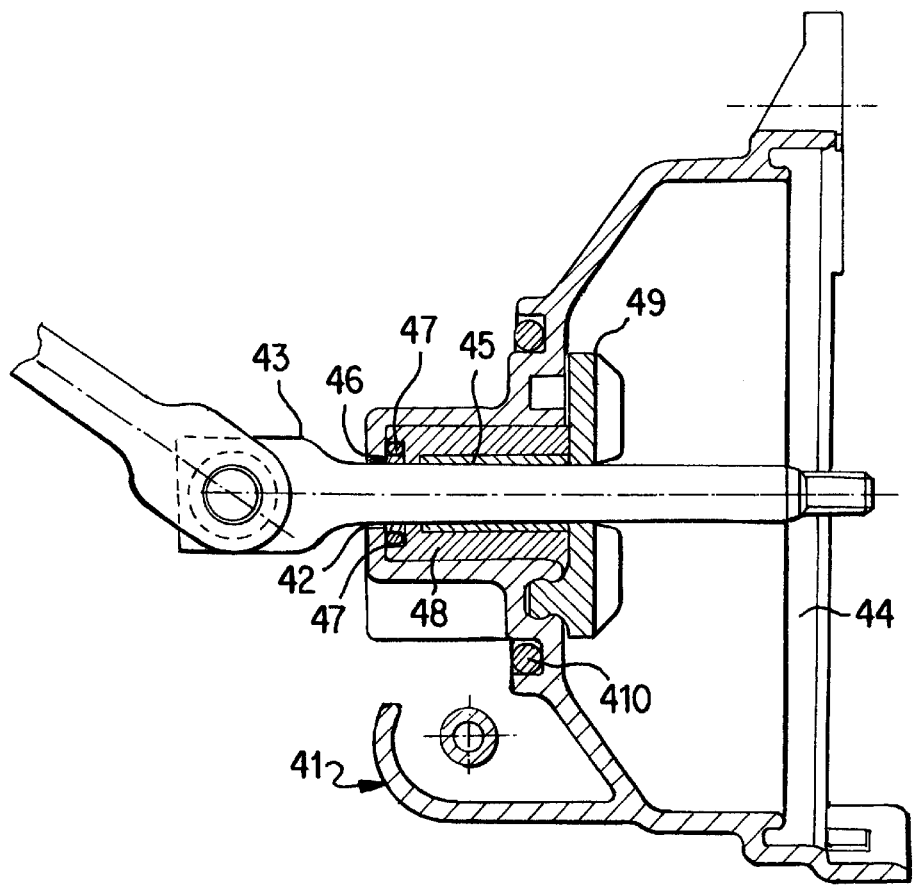

A known device and an embodiment of the device according to the invention will be explained with reference to the drawing, wherein:

FIG. 1 shows a schematic diagram of a device for controlling the temperature of the intake air of mixture-compressing internal combustion engines according to the state of the art, and FIG. 2 shows a section through a device according to the invention, with a sealing and guiding system for an operating rod between a pressure box and an adjustable flap.

DESCRIPTION OF THE WORKING EMBODIMENT

FIG. 1 schematically depicts a device according to the state of the art for an internal combustion engine not represented here, with an air intake duct 1 bearing a carburetor 2 with an arbitrarily controllable main throttle valve 3. An air intake filter 4 with an annular filter insert 6, through which air flows radially from the outside to the interior, surrounding a clean air chamber 5 and an air intake duct 7 are mounted on the carburetor 2. The air intake duct 7 has a raw air connection 8 into which a cold air duct 9 and a warm air duct 10 open. The warm air is delivered to the warm air duct 10 from the vicinity of the exhaust pipe of the internal combustion engine by a warm air line, not shown in the drawing.

In the known device according to FIG. 1 the operating rod 14 of a pneumatic adjusting motor 15, in this case a pressure box, engages a control flap 11 pivotably arranged in the raw air connection with a lever 12 and a pivot axis 13. The servo motor 15 contains a rubber diaphragm 16 and a return spring 17 extending through a control pressure chamber 19 and is connected through a control pressure line 37 downstream from the main throttle valve 3 of the carburetor 2 to the intake duct 1 of the internal combustion engine. The control valve 11 can be pivoted by the pneumatic servo motor 15 against the force of the return spring 17 from its end position shown in a solid line in which it closes the warm air duct 10 and simultaneously opens the cold air duct 9, to its other end position represented by a broken line, in which it closes the cold air duct 9 and opens the warm air duct 10.

The controlling pressure line 37 contains a vent valve constructed as a temperature-controlled valve 25. In the valve housing 26 a bimetal element 27 is fixed at one end and bears at its free end a valve body 28. When the predetermined target temperature is reached, the valve body 28 opens a connection 29 to the clean air chamber 5 of the air intake filter 4. The transfer of the temperature from the clean air chamber 5 to the bimetal element 27 takes place through an opening, not shown, which is small in proportion to the connection 29, and in a known manner admits an air stream having no significant effect on the pressure conditions into the interior of the valve housing 26.

In the cold air duct 9 a thermostat 40, constructed as a wax thermostat, is disposed perpendicular to the pivot axis 13 and substantially perpendicular to the direction of flow of the aspirated air. The thermostat 40 has a housing and a thrust pin. It is supported at one end by the housing through a compression spring, and at the other hand by the thrust pin against the inside wall of the cold air duct 9, which for this purpose is bulged outwardly at the points of contact of the compression spring and the thrust pin. The housing of the thermostat 40 forms a movable stop which establishes the range of the rotation of the control flap 11 in the direction in which the warm air duct 10 is closed.

During the operation of the internal combustion engine a vacuum prevails in the entire air intake system, which is greatest in the air intake duct 1 and decreases toward the cold air duct 9. The large vacuum from the air intake duct 1 is transferred by the control pressure line 37 to the control pressure chamber 19 of the pneumatic servo motor 15 above the rubber diaphragm 16. There it exercises a force for the operation of the control flap 11 in accordance with the vacuums prevailing on both sides of the rubber diaphragm 16 and in accordance with the area of the diaphragm. In addition, the air which can pass through the connection 29 into the thermostat valve 25 and thus into the control pressure line 37 has a substantial influence on the pressure conditions in the control pressure line, if the bimetal valve 27 has flexed upwardly above a certain temperature and the valve body 28 has opened the connection 29.

When the main throttle valve is closed, for example when idling, the vacuum in the air intake duct 1 is especially great. If, when the aspirated air has an appropriately low temperature, the connection 29 is closed, the large vacuum occurring in the pneumatic servo motor 15 above the rubber diaphragm 16 is able to turn the control valve 11 against the force of the return spring 17 to the position indicated by the broken line, in which it closes the cold air duct 9 and has opened the warm air duct 10. If the temperature of the air that enters the raw air connection 8 through the warm air duct 10 and, after passing through the filter insert 6, reaches the clean air chamber 5 and thereby affects the thermostat valve 25, exceeds a predetermined level, the bimetal valve 27 begins to flex upwardly. The valve body 28 opens the connection 29 to the clean air chamber 5, and additional clean air can enter the control pressure line 37 and there it can decrease the vacuum. As a result, the control flap 11 swings away from its end position in which it closes the cold air duct 9 a sufficient distance until the mixed air reaches the temperature at which an equilibrium is established between the force of the return spring 17, on the one hand, and, on the other hand, the forces present at the rubber diaphragm 16 of the pneumatic servo motor 15 as well as the force on the control flap 11.

As the main throttle valve 3 of carburetor 2 increasingly opens, the vacuum in the intake duct 1 decreases. When the main throttle valve 3 is fully open, the vacuum in the intake duct 1 and thus in the control pressure chamber 19 of the pneumatic servo motor 15 is so slight that it is no longer sufficient to overcome the force of the return spring 17. Above a predetermined temperature of the air flowing in through the cold air duct 9, the warm air duct 10 is then in any case closed and the internal combustion engine receives air only through the cold air duct 9. The lower temperature resulting from the closing of the warm air duct 10 leads to a better filling of the engine, so that better power is attained in full-throttle operation.

However, if the air aspirated through the cold air duct 9 falls below the preset temperature, the housing of the thermostat 40 with the movable stop is displaced downwardly so far that, when the control flap 11 moves in the direction closing the warm air duct 10, the lever 12 eventually strikes against the movable stop before the warm air duct 10 is fully closed. In this position of the control flap 11 a little more warm air is mixed in, so that the air mixture does not fall below a desired level and, for example, unwanted carburetor icing is reliably prevented.

In FIG. 2 a pressure box or vacuum box 41 according to the invention is illustrated as a pneumatic adjusting motor corresponding to the adjusting motor 45 of FIG. 1, into which a movable mechanical part 43 extends through an opening 42 to serve as an operating rod which can be driven by a pressure diaphragm 44. In the opening 42 of the vacuum box 41 is a sealing system which is comprised of a synthetic resin friction bearing 45, a Teflon ring 46 and an elastomer ring 47.

The synthetic resin friction bearing 45 extending axially over a given length surrounds the mechanical part 43 in such a way as to assure a good and durable movement. The necessary pressure sealing is achieved by means of the Teflon ring 46 which here contacts the mechanical part 43 relatively tightly. To increase the contact pressure the elastomer ring 47 is applied around the Teflon ring 46. The sealing system is embedded in a bushing 48 which is held by a fastening means 49 against the opening 42 of the vacuum box 41. The entire pressure box 41 can be integrated into an intake duct housing for an internal combustion engine, for example by a seal 410 and a bayonet coupling, not shown here.

What is claimed is:

1. Apparatus for regulating the temperature of intake air of an internal combustion engine, said apparatus comprising:

a pivotable control flap disposed in a raw air intake duct leading to an air filter;

a pressure box for operating the pivotable control flap, said pressure box containing a diaphragm;

an operating rod operatively connected between said diaphragm for moving said control flap in response to movements of the diaphragm, said operating rod being comprised of a plurality of rod elements which are pivotable relative to each other and which together form a movable mechanical linkage, one of said rod elements extending through an opening in said pressure box into the interior of said pressure box, whereby said mechanical linkage is guided mechanically in the pressure box, and said one rod element being connected to said diaphragm;

a seal for sealing said movable mechanical linkage relative to said pressure box, said seal comprising a synthetic resin friction bearing which contacts said one of said rod elements over a given length, and which is tightly anchored in said opening in the pressure box; and a Teflon ring arranged at one end of the synthetic resin friction bearing surrounding said movable mechanical linkage in a pressure-tight manner.

2. An apparatus according to claim 1, further comprising an elastomeric ring externally around the Teflon ring, which tightly squeezes the Teflon ring.

3. An apparatus according to claim 1, wherein said pressure box is a vacuum box communicating via a vacuum line with an intake manifold of an internal combustion engine downstream of a throttle valve.

4. An apparatus according to claim 3, wherein said vacuum box is connected to said raw air intake duct by a bayonet connector.

* * * * *